June 28, 1932.  R. E. BUCK  1,865,231
TIRE VALVE STEM
Filed May 6, 1929
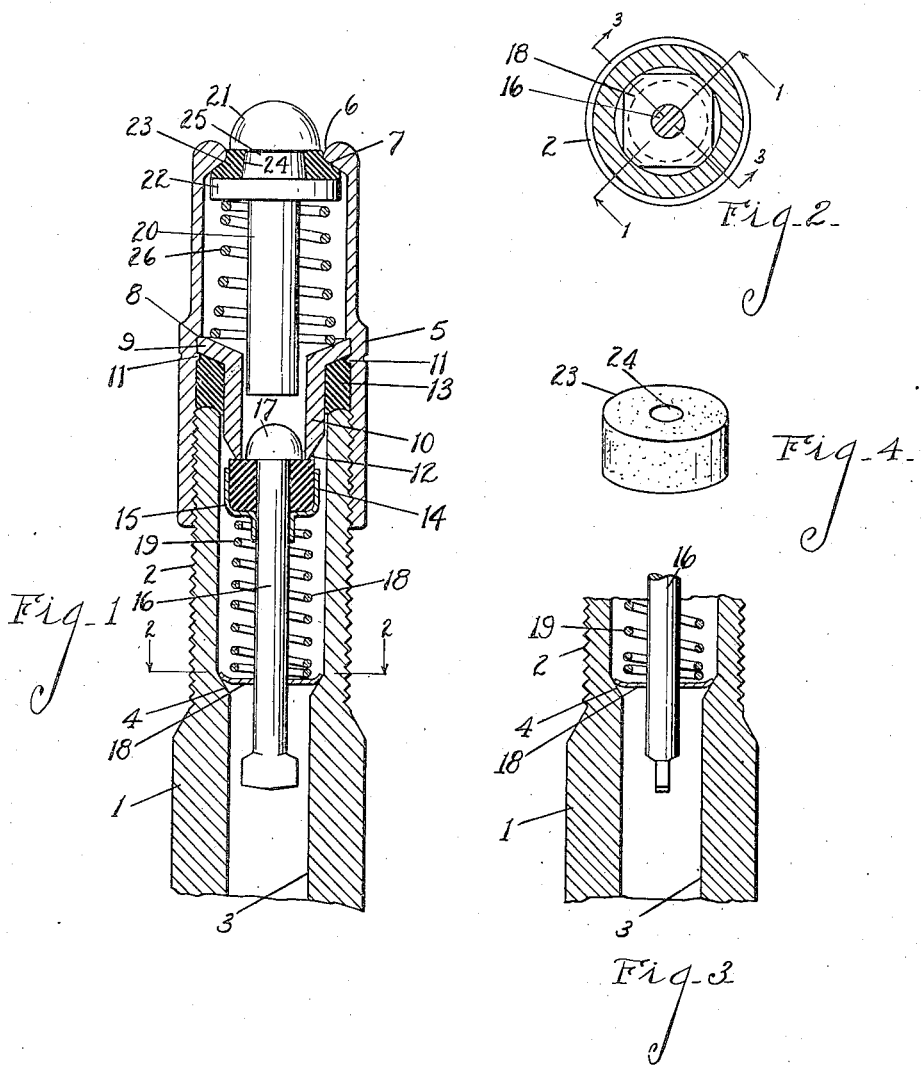
INVENTOR
Russell E. Buck
BY Chappell Earl
ATTORNEYS Patented June 28, 1932

1,865,231

UNITED STATES PATENT OFFICE

RUSSELL E. BUCK, OF VICKSBURG, MICHIGAN

TIRE VALVE STEM

Application filed May 6, 1929. Serial No. 360,678.

The main object of this invention is to provide an improved tire valve stem in which the air is effectively retained and at the same time may be introduced to the tire or the tire pressure tested without the necessity of removing caps or closures.

A further object is to provide a structure having these advantages which is economical to produce and the parts are of substantial size and easily assembled.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary view mainly in longitudinal section on line 1—1 of Fig. 2 of a tire valve stem embodying my invention.

Fig. 2 is a transverse section on line 2—2 of Fig. 1.

Fig. 3 is a detail view mainly in section on line 3—3 of Fig. 2.

Fig. 4 is a perspective view of the closure valve.

The embodiment of my invention illustrated comprises a stem 1 having an externally threaded nipple portion 2 at its outer end. The bore 3 of this stem is unthreaded but is formed with an outwardly facing shoulder 4. This permits very economical production of the stem, it not being necessary to provide more than the one shoulder or to internally thread or tap the same. Also, it will be noted that only the external threads are on the nipple.

I provide a closure member 5 having an opening 6 at its outer end surrounded by an inwardly facing beveled valve seat 7. The closure has an internal shoulder 8 against which the flange 9 of the valve seat member 10 is seated. Indentations 11 below the flange retain the valve seat member rotatably; that is, so that it can swivel within the closure.

The inner end of the valve seat member is externally beveled providing a relatively thin valve seat 12.

A gasket 13 is arranged around the valve seat member and is supported thereby so that it coacts with the end of the stem 2 effectively sealing the joint between the closure and the stem. Owing to the valve seat member being swivelled, the gasket, even though made of soft rubber, is not distorted or injured in the event the closure be screwed down further than is necessary as the valve seat member will remain stationary while the closure rotates; that is, after sufficient pressure has been placed upon the gasket.

The check valve 14 coacts with the valve seat 12, this valve being of relatively soft rubber and supported in a cup-like holder 15 on the stem-like body member 16. This body member has a spherically curved head 17 at its upper end projecting into the lower end of the valve seat member and guided thereby.

The stem is extended through the thrust member 18 which rests upon the shoulder 4, a coiled spring 19 being arranged between the valve holder 15 and this thrust member acting to yieldingly hold the check valve to its seat. The pressure also acts to hold the valve to its seat.

The closure valve comprises a body member 20 having a spherically curved head 21 projecting through the opening 6 in the closure member and a collar 22 spaced from the head 21 to receive the valve 23 which is in the form of a cylinder or disc of relatively soft rubber having a bore 24 of uniform diameter from end to end.

The portion 25 of the valve member 20 between the head and the collar is upwardly tapered so that when the valve is arranged thereon, it is supported so that it tapers upwardly.

The closure valve is held yieldingly to its seat by means of the coiled spring 26 arranged between the collar and the flange 9 of the valve seat member.

My improved tire valve stem is very effective in retaining air. At the same time air may be introduced or the tire tested without removing any part. When a tire chuck is placed upon the end of the closure member, the closure valve is depressed thereby opening the chuck valve. This opening takes place before the valve of the air chuck is opened so that in the event there is any air in the tire, some air will be permitted to escape thereby blowing dust or dirt from around the opening of the closure so that when the air chuck is fully opened, little if any dirt is carried into the valve.

The parts of my valve are of considerable size so that they are substantial and easily to assemble. So far as the check valve is concerned, it is much simpler than check valves now commonly used in pneumatic tires. The entire structure with the two valves is more economical than structures now in use in which check valves and closures and dust caps are employed.

Having thus described my invention, what I claim as new and desire to secure by Letters Patent, is:

1. In a tire valve, the combination with a valve stem having an inner bore and a shoulder therein, of a closure unit comprising a cylindrical closure member having means at one extremity for attachment to the exterior of the valve stem and having an opening at its opposite extremity, depressible means mounted within the closure member having a portion protruding through the latter extremity of the closure member, and an annular seat member mounted within the closure member; a removable valve unit mounted within the stem and comprising an elongated body member, a valve member on one extremity thereof, a thrust member slidably mounted on the opposite extremity of the body member and a spring between the valve member and thrust member, said valve unit being loosely mounted in the bore of the stem with the thrust member engaging the shoulder therein; the seat member of said closure unit upon application of the unit to the valve stem engaging said valve member in sealing relation therewith and depressing the same to load the spring of the valve unit, said depressible means upon said assembly being depressible to engage and unseat said valve.

2. In a tire valve the combination with a valve stem having an inner bore and a shoulder therein, of a closure unit comprising a cylindrical closure member having means at one extremity for attachment to the exterior of the valve stem and having an opening at its opposite extremity, depressible means mounted within the closure member and having a portion protruding through the latter extremity of the closure member, a cylindrical seat member within the closure member and having an annular seat portion extending toward the valve stem; a removable valve unit mounted within the valve stem and comprising an elongated body member having a curved head at one extremity, a valve member on one extremity thereof below said curved head, a thrust member mounted at the opposite extremity of the body member, resilient means between the valve member and thust member; the inner wall of the seat member upon application of the closure unit to the valve stem engaging said curved head to axially arrange the end of the valve unit thereto, said seat portion subsequently engaging said valve member in sealing relation therewith and depressing the same to load the resilient means of the valve unit, said depressible means upon said assembly being manually operable to unseat said valve.

3. A closure unit for a valve stem comprising a cylindrical closure member open at opposite ends and provided at one end with means for securing to a valve stem, a pair of spaced valve seats within the closure member, a valve on the outermost of the seats, stem means on the valve having one portion extending through the free end of the closure member and another portion extending to the remaining valve seat; a valve body on the remaining valve seat, and a resilient means for each valve for engaging each valve to urge the valves to their respective seats; said stem being depressible to unseat said first valve and being further depressible to engage and unseat said last named valve.

In witness whereof I have hereunto set my hand.

RUSSELL E. BUCK.